L. L. WILSON.
WATER COOLING APPARATUS.
APPLICATION FILED JAN. 20, 1913.

1,079,087.

Patented Nov. 18, 1913.

2 SHEETS—SHEET 1.

L. L. WILSON.
WATER COOLING APPARATUS.
APPLICATION FILED JAN. 20, 1913.
1,079,087.
Patented Nov. 18, 1913.
2 SHEETS—SHEET 2.
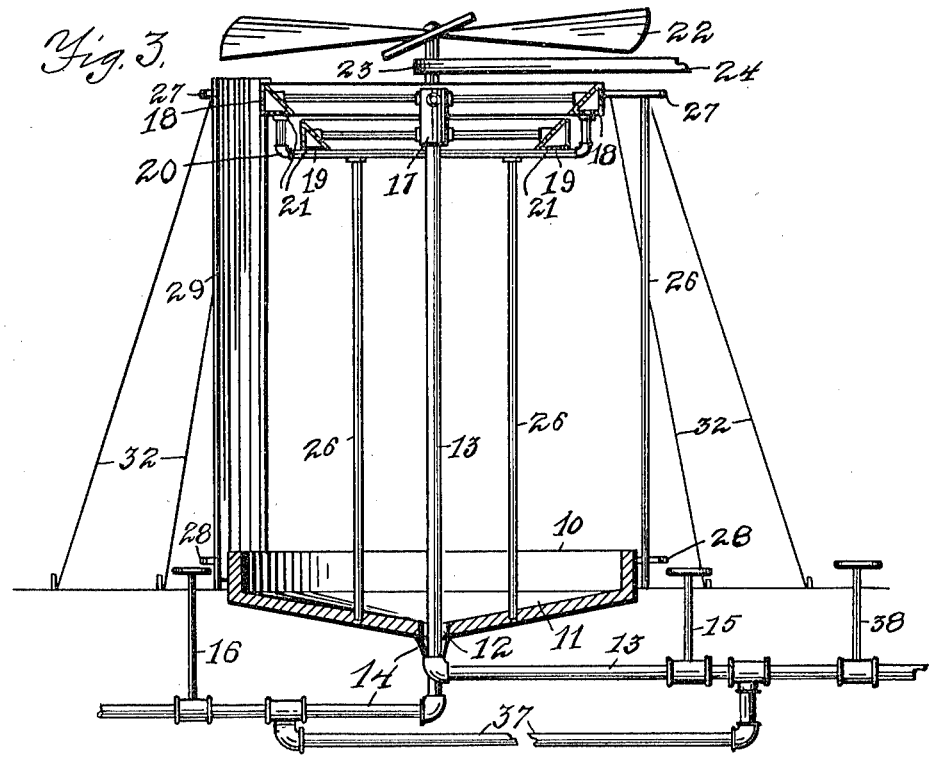
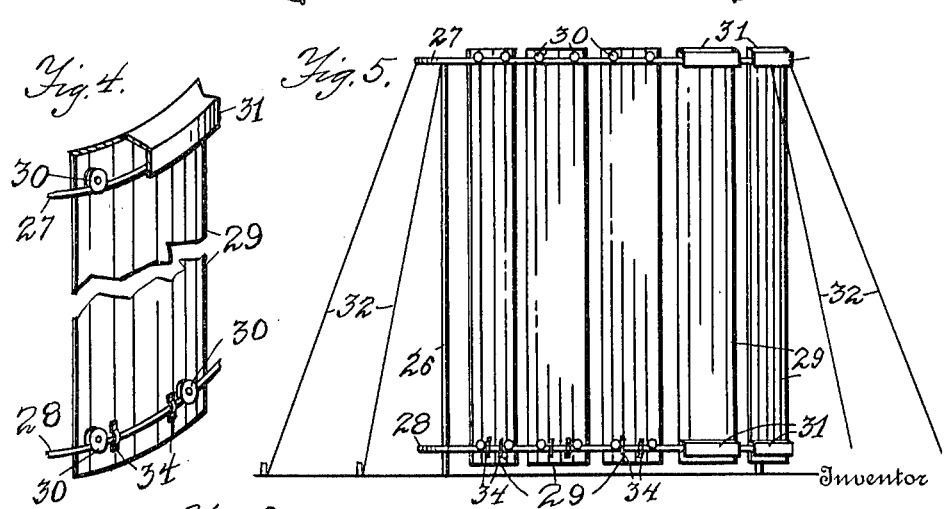
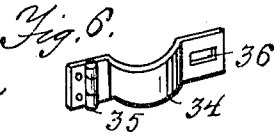

UNITED STATES PATENT OFFICE.

LYDELL L. WILSON, OF RANDOLPH, NEW YORK.

WATER-COOLING APPARATUS.

1,079,087.  Specification of Letters Patent.  Patented Nov. 18, 1913.

Application filed January 20, 1913. Serial No. 742,988.

*To all whom it may concern:*

Be it known that I, LYDELL L. WILSON, a citizen of the United States, residing at Randolph, in the county of Cattaraugus and State of New York, have invented certain new and useful Improvements in Water-Cooling Apparatus, of which the following, taken in connection with the accompanying drawings, is a specification.

The invention relates to machines for cooling liquids, and particularly in the cooling of water for the production of ice in connection with an ice manufacturing plant; and the object of the improvement is to provide a stand pipe with sprinklers thereon above a tank or receptacle and a fan above said sprinklers, provision being made for wind shields to prevent the blowing of the water away from the receptacle; and the invention consists in the construction and combination of the parts as shown in this specification and the accompanying drawings and pointed out in the claims.

Figure 1:
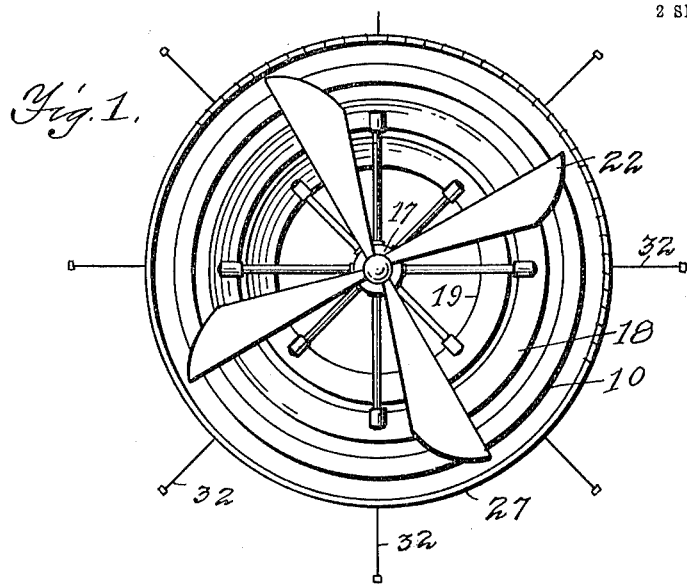
Figure 2:
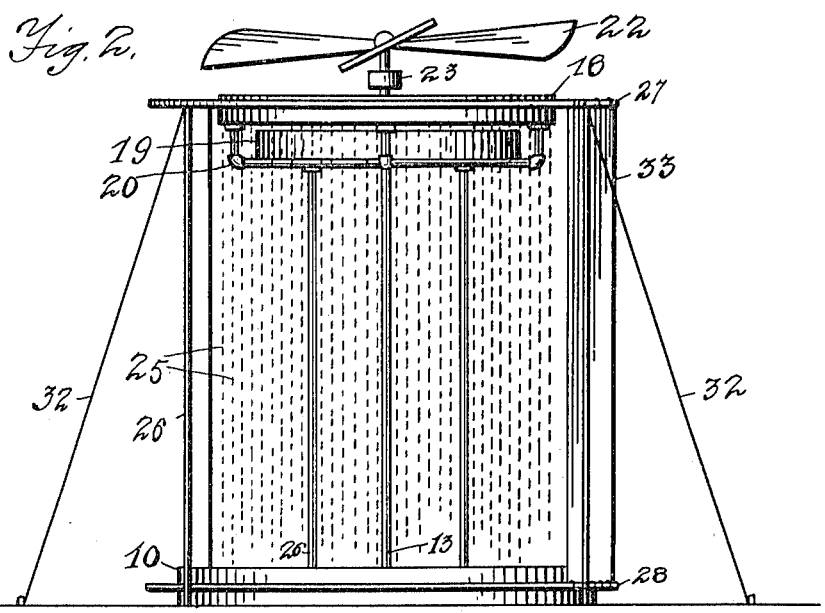

In the drawings, Figure 1 is a plan view of the water cooling apparatus; and Fig. 2 is a side elevation of the same. Fig. 3 is a vertical sectional view at line X X in Fig. 1, showing the arrangement of the parts. Fig. 4 is a perspective view of the sectional wind shield arranged to operate on circular tracks or rods; and Fig. 5 is an elevation of the same. Fig. 6 is a perspective view of the latch strap for holding a wind shield section upon the supporting frame or tracks.

Like numerals of reference refer to corresponding parts in the several views.

The numeral 10 designates the tank or receptacle into which the liquid falls, which is preferably made of cement with an inclined bottom 11 which converges toward the central opening 12. The opening 12 is provided in the center of the bottom 11 to afford a drain for the liquid with a drain pipe 14 having a controlling valve 16. The stand pipe 13 preferably enters through the center of the tank 10 and has controlling valves 15 and 38. It extends a sufficient distance above the tank or receptacle 10 to provide sufficient fall for the liquid in cooling the same and supports a distributing head 17 near its upper end. A pair of ring sprinklers 18 and 19 are supported upon a frame 20 and are connected at spaced distances by cross tubes with the head 17. The ring sprinklers 18 and 19 are preferably arranged one smaller than the other, the smaller sprinkler 19 being placed below the larger sprinkler 18, and the upper and inner surface of the two sprinklers is inclined so that the upper surface of the two sprinklers, when arranged as shown, presents a continuous incline toward the center or stand pipe 13, which serves a purpose hereinafter set forth. The sprinklers 18 and 19 have a plurality of holes or perforations 21 on their under surface so that the water or other liquid flowing through the perforations 21 falls into the tank 10. The placing of the ring sprinklers 18 and 19 one within the other presents a broad sprinkling surface on their undersides equal to the width of the two sprinklers.

A fan 22 is rotatably mounted above the stand pipe 13 on frame 20 above the distributing head 17, suitable means, as for example a pulley 23 and belt 24, being provided for rotating said fan. The blades of the fan 22 are so inclined as to throw a continuous downward current of air which strikes on the inclined upper surfaces of the sprinklers 18 and 19 and is thereby directed toward the center so as not to divert the falling water 25 from the tank 10. The blades of the fan 22 also extend out beyond the larger sprinkler 18 so that a current of air passes down on the outer as well as the inner sides of the falling water 25 as it drops into the tank 10, and it is intended not to run the fan 22 so swiftly as to force the motion of the water in any way, only to cool the same.

In the cooling of the water or other liquid by the agitation of the cold atmosphere it is apparent that the sprinklers 18 and 19 must be raised a considerable distance above the tank 10 and during windy days when the spray of the dropping water 25 would be blown to one side or out of the tank 10 a wind shield should be provided. This is preferably arranged on a circular frame 26 having suitable standards supporting an upper track 27 and lower track 28. A series of wooden sections or shields 29 are preferably mounted on the circular tracks 27 and 28 by means of suitable wheels rotatably mounted on the outer sides of the shields 29, a suitable covering or protection 31 being provided for the upper and lower wheels 30. Suitable stays 32 are provided for the support of the frame 26 to hold it firmly in position.

It is apparent that the wind shields 29 must be so attached to the tracks or circular frames 27 and 28 that they can not be blown or otherwise moved therefrom or along the same when placed in a desired position. For this purpose the strap latches or hinged locking pieces 34 are attached by the hinged end 35 and extend over the track 27 or 28 and are fastened by means of a staple or hasp through the slot 36 in the end of the latch 34. Two latches 34 are preferably attached over the lower track 28 for each section 29, as the lower track 28 is most convenient to reach and this is sufficient to hold the section 29 firmly in place, though added latches might be used over the upper track or rod 27 without departing from my invention.

It is apparent that canvas curtains, as shown at 33 in Fig. 2, might be used in place of the series of shields 29 and serve a good purpose, though not as durable or handy in use as the series of shields 29.

In operating the cooling apparatus the water or other liquid is turned through the sprinklers 18 and 19 and the stand pipe 13 by means of the valve 15 and will drip through the holes 21 in the lower sides of the sprinklers 18 and 19 dropping into the tank 10 and draining off through the drain pipe 14 when valve 16 is opened. The water may again be forced through the pipe 13 by means of a force pump, the connecting pipe 37 and the additional valve 38. Said valve 38 cuts off the regular flow of water from the pipe 13 and permits the entrance of the water from the force pump as drained out by the drain pipe 14. It is apparent that the water or other liquid can be re-circulated in this manner as many times as is necessary to reduce it to the temperature desired. The fan 22 is rotated while the water is dropping from the sprinklers 18 and 19, thereby causing a constant agitation of the air about and through the dripping water 25 and greatly aiding in the cooling of the same. When the water is reduced to the desired temperature it is run into the molds to freeze thereby freezing much quicker than would otherwise be the case.

I claim as new:—

1. A device of the class described comprising a tank, a plurality of tubular ring sprinklers supported on a suitable frame a spaced distance above said tank, said ring sprinklers being concentrically arranged to give a broad sprinkling surface above said tank, a central head within said ring sprinklers having radial pipe connection thereto, a supply pipe to said head, a fan rotatably mounted above said ring sprinklers and extending beyond the same to cool the dripping water, means for rotating said fan, said ring sprinklers being formed to divide the air current from said fans, substantially as and for the purpose specified.

2. In a device of the class described, a tank, a frame extending a spaced distance above said tank, concentrically arranged tubular ring sprinklers supported on said frame having perforations on their lower sides for the liquid to flow through, the upper sides of said ring sprinklers inclined toward the center to direct a portion of the air current toward said center, a fan rotatably mounted above said ring sprinklers, and means for rotating said fan.

In testimony whereof I have affixed my signature in the presence of two witnesses.

LYDELL L. WILSON.

Witnesses:
 H. A. SANDBERG,
 ARTHUR O. MORSE.

Copies of this patent may be obtained for five cents each, by addressing the "Commissioner of Patents, Washington, D. C."